US011530870B2

(12) United States Patent
Bertschi

(10) Patent No.: US 11,530,870 B2
(45) Date of Patent: Dec. 20, 2022

(54) COVER FOR A DRAWER, AND VACUUM DRAWER DEVICE WITH A COVER

(71) Applicant: Julius Blum GmbH, Hoechst (AT)

(72) Inventor: Daniel Bertschi, Gelfingen (CH)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 16/963,170

(22) PCT Filed: Jan. 10, 2019

(86) PCT No.: PCT/EP2019/050504
§ 371 (c)(1),
(2) Date: Jul. 17, 2020

(87) PCT Pub. No.: WO2019/141574
PCT Pub. Date: Jul. 25, 2019

(65) Prior Publication Data
US 2021/0123667 A1    Apr. 29, 2021

(30) Foreign Application Priority Data

Jan. 18, 2018   (CH) ..................................... 00054/18

(51) Int. Cl.
*F25D 25/02*     (2006.01)
*A47B 88/40*    (2017.01)
(Continued)

(52) U.S. Cl.
CPC ............ *F25D 25/025* (2013.01); *A47B 88/40* (2017.01); *A47B 2088/901* (2017.01);
(Continued)

(58) Field of Classification Search
CPC . F25D 25/025; A47B 88/40; A47B 2088/901; A47B 2210/08; A47B 2210/175
(Continued)

(56) References Cited

U.S. PATENT DOCUMENTS

| 5,806,575 A | 9/1998 | Tsay |
| 6,170,276 B1 * | 1/2001 | Mandel ................. F25D 25/021 62/187 |

(Continued)

FOREIGN PATENT DOCUMENTS

| CH | 713601 A2 | 9/2018 |
| CN | 204693942 U | 10/2015 |

(Continued)

OTHER PUBLICATIONS

International Search Report dated Apr. 1, 2019 for PCT/EP2019/050504 filed Jan. 10, 2019.

(Continued)

*Primary Examiner* — James O Hansen
(74) *Attorney, Agent, or Firm* — Paul D. Bianco; Gary S. Winer; Fleit Intellectual Property Law

(57) ABSTRACT

To configure existing drawers as evacuable drawers of a vacuum drawer device, a cover for installation in the drawer body can be used. The cover evacuates at the drawer interior with an evacuation system, so that the interior is evacuated when the drawer is closed and ventilated before the drawer is opened. The cover is airtight, is profiled in such that evacuation with a controller, a pump and a valve are fixedly integrated in at least one recess in the cover and the cover has at least one air channel leading into the inside of the cover or, respectively, into the at least one recess, with the air channel operatively connected to the evacuation system such that when the cover is placed onto the drawer, air from the interior can be pumped out of the interior, the inside of the cover interior or, respectively, the at least one recess through the air duct.

17 Claims, 6 Drawing Sheets

(51) Int. Cl.
*A47B 88/90* (2017.01)
*B65B 31/00* (2006.01)

(52) U.S. Cl.
CPC ..... *A47B 2210/08* (2013.01); *A47B 2210/175* (2013.01); *B65B 31/00* (2013.01); *B65F 2210/188* (2013.01)

(58) Field of Classification Search
USPC .......................................................... 312/404
See application file for complete search history.

(56) References Cited

U.S. PATENT DOCUMENTS

| | | | | |
|---|---|---|---|---|
| 9,869,506 B2* | 1/2018 | Hanson | ................. | F25D 25/025 |
| 2003/0025424 A1 | 2/2003 | Graves | | |
| 2004/0060319 A1* | 4/2004 | Wood | ................... | A47B 88/487 |
| | | | | 312/401 |
| 2005/0061370 A1* | 3/2005 | Higer | ................... | B65B 31/025 |
| | | | | 137/221 |
| 2006/0117763 A1* | 6/2006 | Espinosa | ................ | A47B 88/40 |
| | | | | 62/78 |
| 2007/0119485 A1 | 5/2007 | Gunnerson | | |
| 2007/0234690 A1* | 10/2007 | Ryan | ..................... | A47L 7/0047 |
| | | | | 55/429 |
| 2015/0253065 A1* | 9/2015 | Min | ...................... | F25D 25/025 |
| | | | | 312/404 |
| 2015/0305496 A1* | 10/2015 | Sacks | .................... | A45D 44/02 |
| | | | | 312/226 |
| 2015/0306263 A1* | 10/2015 | Yanke | ...................... | A61L 2/00 |
| | | | | 250/455.11 |

FOREIGN PATENT DOCUMENTS

| | | |
|---|---|---|
| CN | 106275704 A | 1/2017 |
| DE | 202017006169 U1 | 1/2018 |
| EP | 1790270 A2 | 5/2007 |
| JP | H03170107 A | 7/1991 |
| WO | WO0171263 A1 | 9/2001 |

OTHER PUBLICATIONS

Written Opinion for PCT/EP2019/050504 filed Jan. 10, 2019.
International Preliminary Report on Patentability dated Jul. 21, 2020, with Written Opinion for PCT/EP2019/050504 filed Jan. 10, 2019 (English translation).
First Chinese Office Action dated Dec. 2, 2021 for Application No. 201980009281.8 (English translation).
Office Action for Chinese Patent Application No. 201980009281.8, dated May 19, 2022.
English Translation of Portion of Search Report for Swiss Patent Application No. CH00054/2018, dated Oct. 26, 2018.

* cited by examiner

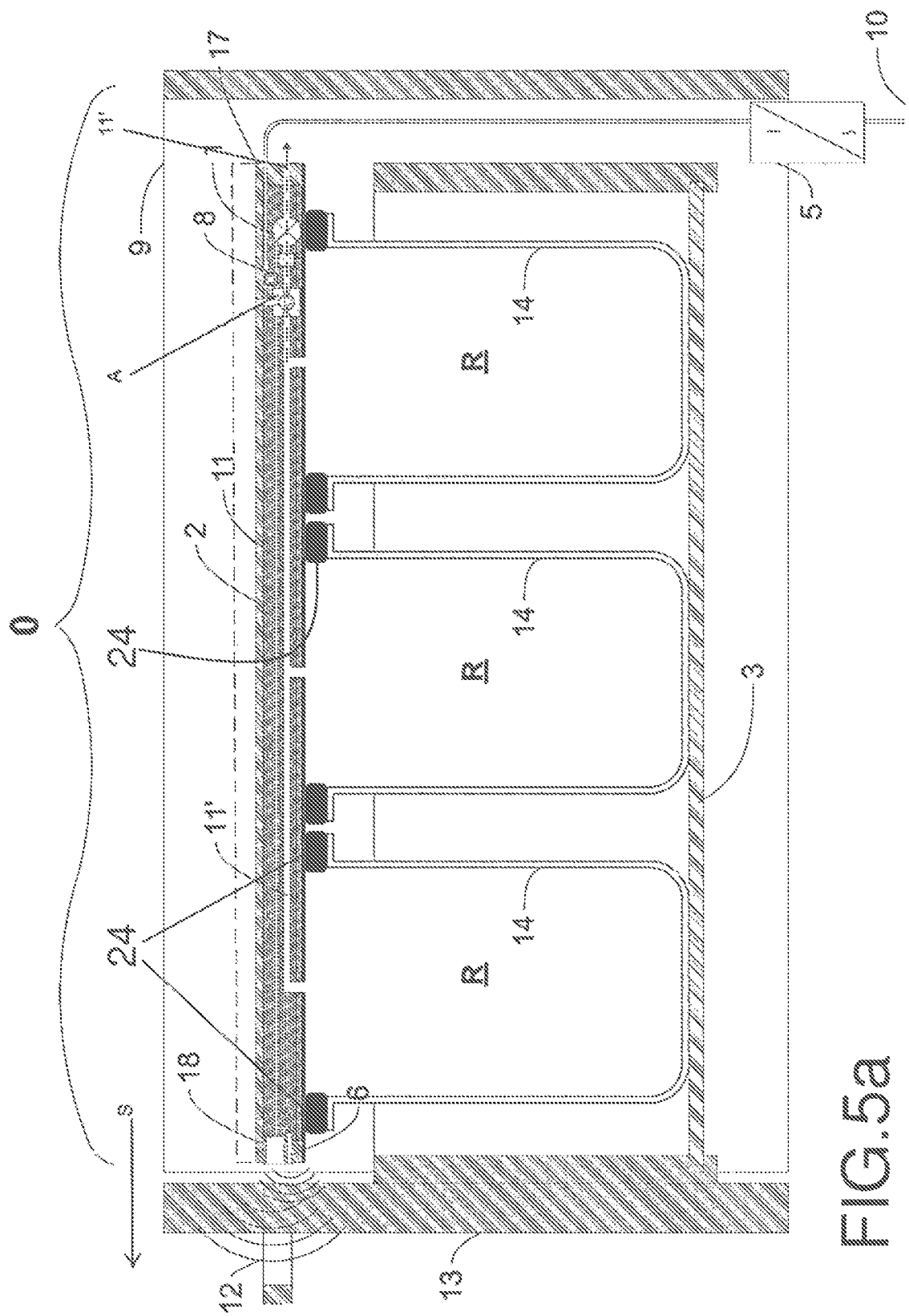

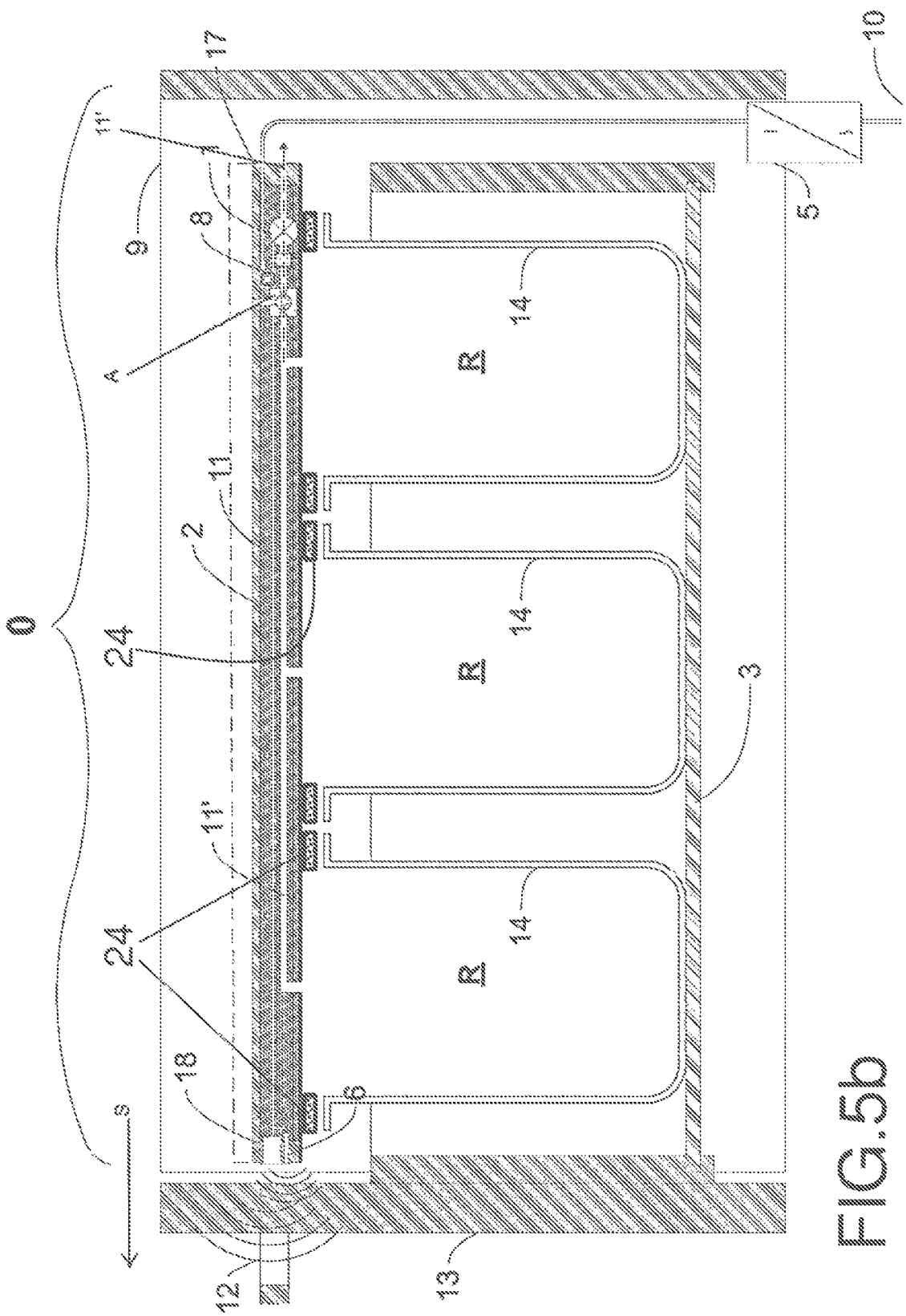

COVER FOR A DRAWER, AND VACUUM DRAWER DEVICE WITH A COVER

TECHNICAL FIELD

The present invention describes a cover for installation in a drawer body, which can be arranged so as to be operatively connectable to a linearly movable drawer, the cover being suitable for evacuating at least one drawer interior by means of evacuation means, so that the at least one drawer interior is evacuated when the drawer is in a closed position and can be ventilated before the drawer is opened, a vacuum drawer device and a method of converting a drawer body with a drawer, wherein the drawer is mounted so as to be linearly movable in a drawer movement direction by means of a drawer pullout.

BACKGROUND

At present, rapidly perishable food is stored in the refrigerator in private households of industrialized countries. The refrigerator has the advantage of being able to lower the internal temperature in order to delay the growth of destructive bacteria cultures. Also, the refrigerator can be regarded as a closed storage place for food which, when closed, prevents unwanted influences, such as insects or pollen, from negatively influencing the quality of the food.

However, the refrigerator has some disadvantages, as it continuously needs electricity to generate cooling energy via a compressor. At the same time, waste heat is generated, which is released into the ambient air behind the refrigerator and conducted into the room through ventilation slits in the kitchen panels, which is not desirable in summer.

In recent decades, refrigerators have polluted our environment to such an extent that the international community had to intervene to ban the ozone-depleting refrigerant CFC. Other environmental problems are the foaming agents for insulating the refrigerator used from 1990 onwards. Under pressure from environmental organizations, the international community has been able in recent years to increasingly limit, but not prevent, the negative effects on the environment during the manufacture, operation and disposal of refrigerators. Less attention has so far been paid to the internal climate of the refrigerator. According to a study by the Hygiene Council, which conducted an international study called Hygiene Report 2010, the refrigerator with around 11,400,000 germs per square centimeter is contaminated more than the toilet with around 100 pathogens per square centimeter. This 2010 report received a great deal of media attention, but apart from recommendations to clean the refrigerator more often, no noticeable improvements have been implemented so far. The number of germs is not necessarily the problem, as it is more important to know which germs are most harmful to humans. Jean-Pierre Hugot of the Paris Hopital Robert Debré has studied the climatic conditions inside the refrigerator. According to his opinion, "cold-loving" microbes such as yersilins and listeria feel very comfortable in the refrigerator. It is possible that these microbes can cause the digestive disease Crohn's disease.

On Wikipedia, on Oct. 10, 2016, after mentioning the research result of Jean-Pierre Hugot, the following sentence is written: "The consumption of spoiled food because of renouncing the refrigeration, however, might involve bigger disease risks." According to the sentence, refrigerating food in a refrigerator is just slightly healthier than eating spoiled food.

One aspect of the invention relates to a storage place for food which can do without refrigeration and yet prevents the food from spoiling over the longest possible period of time.

A common way of keeping food fresh without refrigeration is vacuum packing. This has gained acceptance primarily in the hygienically sensitive field of meat products. According to Wikipedia, on Oct. 10, 2016, vacuum packaging is understood as follows: "A vacuum packaging is a gas-tight packaging of a product in which gaps and thus reactive gases within the product have been largely removed. The most important thing is the removal of oxygen from the packaging." Further: "This type of packaging has several advantages. As with modified atmosphere packaging, the products have a longer shelf life because no oxygen, which over time causes the products to become unusable due to chemical reactions or biological processes, can get to the products."

Since vacuum packagings consist of plastic films, these films must be purchased from a manufacturer and disposed of after use. The disposal of the plastic films is usually done by incineration, which in turn pollutes the environment.

Moreover, the refrigerator is not the ideal place to store all foods. Tomatoes, basil, bread, avocado, potatoes etc. are better not stored in the refrigerator.

SUMMARY OF THE INVENTION

One aspect of the present invention relates to the possibility of designing existing drawers as evacuable drawers of a vacuum drawer system by simple means and at low cost. In such vacuum drawer devices, food can be stored in an evacuated manner, wherein the external appearance of a drawer body of known drawer bodies remains unchanged and the drawer can be converted easily and quickly.

Accordingly, a cover is disclosed herein. The cover can easily be integrated into a drawer system and comprises the components necessary for evacuation.

Food that does not necessarily have to be cooled can be stored in a vacuum drawer device at room temperature, wherein increased energy consumption for cooling is avoided. Foodstuffs can thus be kept edible or enjoyable in a simplified manner for a longer period of time.

By moving food that does not necessarily require refrigeration into the drawer cabinet with vacuum drawer device, more space is created in the refrigerator and it is not always necessary to use larger and therefore more environmentally harmful refrigerators.

The storage in the drawer body with vacuum drawer device requires less energy than the refrigerator, since the removal of oxygen inside is completed after a few minutes and no further electricity is required afterwards. The food in the vacuum drawer unit remains fresh, since moisture extraction via the ambient air is prevented. If the ambient air is moister than the food, such as cookies, they can be protected from moisture in the vacuum drawer unit.

A vacuum drawer unit can be implemented without using harmful materials such as refrigerants or thermal insulation.

The consumption of plastic bags for vacuuming can be significantly reduced.

In existing kitchens, which have small refrigerators, in particular in the rental sector, it is possible to convert existing drawer bodies to vacuum drawer devices. An existing drawer can be converted quickly and easily.

The mentioned improvements make it possible to store food in a simpler, more environmentally friendly and energy-efficient manner. This has a positive effect on food quality and consumer health. Furthermore, less food would be thrown away, as its quality can be maintained for longer.

BRIEF DESCRIPTION OF THE DRAWINGS

Preferred exemplary embodiments of the subject matter of the invention are described below in connection with the attached drawings.

FIG. 5a shows a partially schematic illustration of the longitudinal section through a modified vacuum drawer device in a drawer body with the vacuum drawer device closed, while FIG. 5b shows a partially schematic illustration of the longitudinal section as shown in FIG. 5a with ventilated drawer, thus opened vacuum drawer device.

DESCRIPTION

Figure 1:
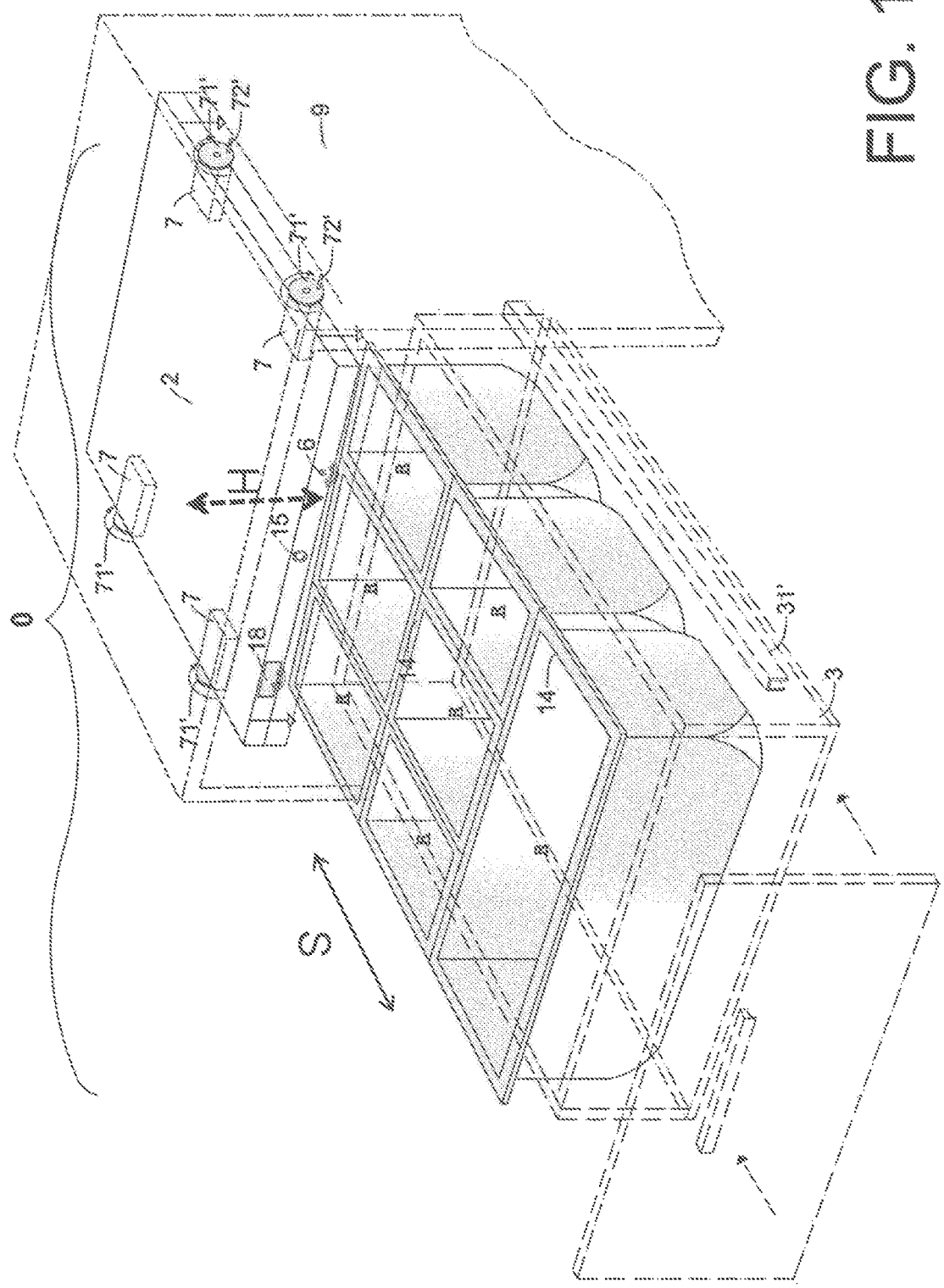
FIG. 1 shows a perspective view of a vacuum drawer device in a drawer body with the drawer opened.

An embodiment of a vacuum drawer device 0 is described below based on FIGS. 1 to 4. As illustrated in FIG. 1, a vacuum drawer device 0 comprises a drawer 3, which is drawn in dashed lines, and a cover 2. The entire device is referred to herein as vacuum drawer device 0 and comprises the drawer 3, which is operatively connectable to the cover 2, and is mounted so as to be linearly movable within a drawer body 9. The drawer body 9 forms the outer casing, in which the cover 2 and the drawer 3 are movably mounted in a protected manner.

A part of the present invention is the possibility of designing, in an evacuable manner, an ordinary drawer 3 which comprises walls and a drawer interior R and is movably mounted in an ordinary drawer body 9 for opening and closing in a linear drawer movement direction S. Here, drawer 3 is mounted in a drawer pullout 31' so as to be linearly movable.

Since means for mounting the drawer 3 are known from commercially available drawers, the drawer pullout is schematically shown here as an example in the form of the guide profile 31' with which the drawer 3 is held and can be brought into an open position and a closed position.

In the simplest version, the one-piece drawer interior R which is bounded by the walls of drawer 3, can be evacuated.

Here, a particular embodiment of the drawer interior R is designed, since this evacuable drawer interior R is formed by a plurality of containers 14, the containers 14 being positioned within the drawer 3 and each having the same height but different sizes. The containers 14 are preferably designed as Gastronorm containers, the interiors of which can form the entire drawer interior R, which can be closed and evacuated by means of the cover 2. The containers 14 are stored in the drawer 3 and can be moved along with the drawer 3, but can also be removed.

The core point for evacuating the drawer interior R is the cover 2, which is movably arranged within the drawer body 9 and which is designed to be airtight and is mounted such that it can be lowered onto the drawer 3 in a lifting direction H perpendicular to the drawer movement direction S.

Lifting means 7, which hold the cover 2 within the drawer body 9 so as to be movable in the lifting direction H, are arranged on or in the cover 2 and within the drawer body 9. With a cover side facing the drawer 3, the cover 2 can be placed onto the walls of the drawer 3 or, respectively, onto the edges of the containers 14, whereby the at least one drawer interior R can be closed. The cover 2 is mounted so as to be movable relative to the drawer body 9 and the drawer 3. Closing only takes place when drawer 3 is in the closed position; in the open position according to FIG. 1, the cover 2 uncovers the drawer 3 completely.

A plurality of servo motors 7 are attached to the cover 2 as lifting means 7 which are connected to lifting means inside the drawer body 9. Rotatable servo discs 71' are each held inside the body 9 by a screw with a bearing sleeve 72' in such a manner that the cover 2 is arranged such that it can be raised from and lowered onto the drawer 3 or the containers 14 in opposite directions.

This results in the lifting movement of the cover 2 in the lifting direction H perpendicular to the drawer movement direction S of the drawer 3. Since the at least one container 14 has a circumferential flange 140, the cover 2 can rest flat on the edge of the container 14 and thus on the flange 140. An airtight seal can thus be achieved in a simplified manner.

In comparison to conventional drawers, the containers 14 within the drawer 3 of the vacuum drawer device 0 can be closed at the top in that the user manually closes the drawer 3 and the cover 2 lowers onto the containers 14 in the closed position of the drawer 3 and seals them airtight from above. A closed position sensor 6, an operating switch/on-off switch 15 and a proximity sensor 18 are attached on the front of the cover 2.

Figure 2:
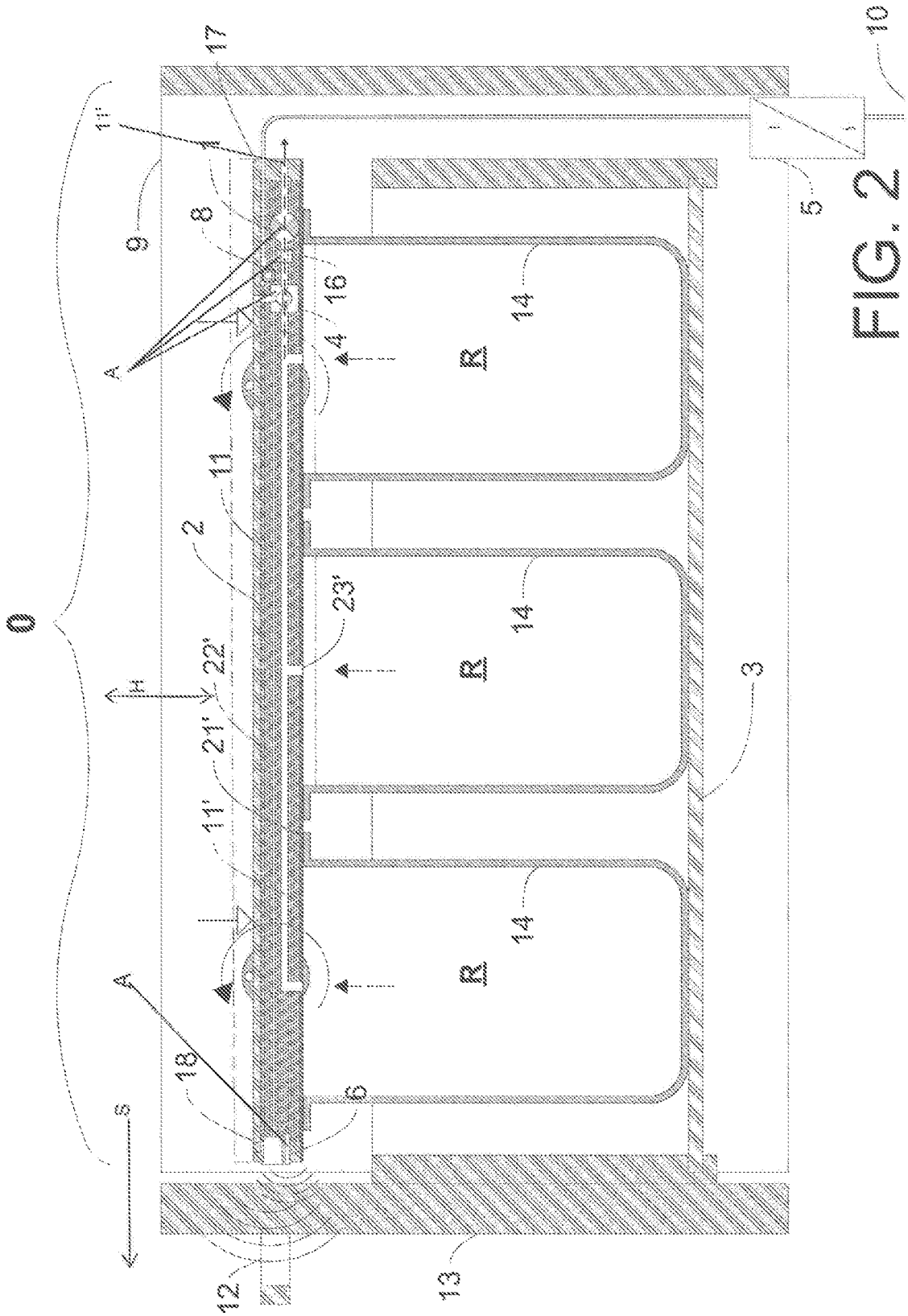
FIG. 2 shows a partially schematic illustration of a longitudinal section through a vacuum drawer device in a drawer body with the vacuum drawer device closed.

As illustrated in FIG. 2, the containers 14 are located inside the drawer body 9 when the drawer 3 is in the closed position with the cover 2 resting on the containers 14 in this situation, thus sealing the container interiors R from above in an airtight manner.

The cover 2 is profiled in such a manner that evacuation means in the form of a controller 8, of a pump 1, of a pressure sensor 16 and of a valve 4 are integrated and secured in at least one recess A in the cover 2. The profiled cover 2 forms a frame 17 for the evacuation means.

Here, the cover 2 includes, as an example, the profile or frame 17 and a foam layer 22'. However, the cover 2 can also be made in one piece from one material. An airtight membrane 21' is arranged on the lower side, facing the containers 14. By means of the airtight membrane 21', which is placed onto the opening of drawer 3 or onto the openings of the containers 14 by means of the cover 2, the container interior R can be sealed in an airtight manner.

The airtight membrane 21' has an air inlet opening 23' to each container interior R. This air inlet opening 23' leads either directly to an air channel 11' or through the foam layer 22' indirectly to an air channel 11'. The air channel 11' crosses the cover 2 at least partially and leads out of the cover 2. The air channel 11' is connected to at least one air inlet opening 23', so that air can be led from the air inlet opening 23' through the air channel 11' out of the cover 2. By means of evacuation means, air can be pumped out of at least one container interior R and through the cover 2 into the interior of the drawer body 9.

Here, an air inlet opening 23' is arranged such that it leads into each container interior R or, respectively, drawer interior R and crosses the airtight membrane 21' so that each container 14 can be evacuated when cover 2 is lowered.

To extract air through the air channel 11', the air channel 11' is connected to the inside of the cover or, respectively, the recesses A, in which the evacuation means are arranged. Here, the controller 8, the pump 1, the pressure sensor 16 and the valve 4 are each located in a recess A in the cover 2 or, respectively, in a recess in the foam layer 22'. The pump 1 is connected to the air channel 11' so that air can be pumped out of the container interior R through the air inlet opening 23', the airtight membrane 21', through the foam layer 22' and the air channel 11'.

When the cover 2 has been placed onto the drawer 3 or, respectively, onto the containers 14, air is pumped out of the at least one drawer interior R through the air channel 11', controlled by the controller 8. The cover 2 is very compact due to the integration of the components and only control cables 11 lead through the cover 2 or the foam layer 22' and one cable leads away from the cover 2 into a power supply unit 5.

Preferably, the valve 4 is designed as a solenoid valve 4. The cover 2 is in particular made of a dimensionally stable fiberboard, preferably an MDF board (medium density wood fiberboard) with an airtight coating, in particular a lacquer.

Optionally, at least one pressure sensor 16 can be arranged, based on the signal of which the controller 8 regulates the evacuation. Here, this pressure sensor 16 is also arranged in a recess A, within the air channel 11'.

The electronic devices 1, 4, 6, 7, 8, 16, 18 are electrically connected via the at least one control cable 11. Each air inlet opening 23' is connected to the pump 1, the solenoid valve 4 and the pressure sensor 16 via the at least one air channel 11'. Inside and close to the rear wall of the drawer body 9 and outside the cover 2 and the drawer 3 there is the power supply unit 5 which is connected to the cover 2 via the power cable 10 and supplies power to the electronic devices. On a front panel 13, which closes the drawer 3 in the opening direction, there is a handle 12 on the outside, and on the front side of the cover 2 there are the proximity sensor 18 and the closed position sensor 6, which are aligned with the handle 12.

The required current is supplied to the cover 2 or to the devices in the drawer body 9 to control the vacuum in the container interior R in that the cover 2 is connected by means of the power cable 10, which in turn is connected to the power supply unit 5. The power supply unit 5 converts the mains voltage with alternating current into the required direct voltage. The direct voltage is fed to the controller 8.

The controller 8 can detect by means of the proximity sensor 18 whether the drawer 3 is open or closed. The proximity sensor 18 is connected to the controller 8 via the control cable 11. The proximity sensor 18 is arranged on or in the cover 2, preferably inside the cover or, respectively, in the at least one recess A such that it faces a front side of the drawer 3, so that contact with the drawer 3 can be detected and the vacuum in at least one drawer interior R can be relieved in a specifically controllable manner. Preferably, the proximity sensor 18 is designed as a capacitive sensor.

Furthermore, the controller 8 monitors the internal pressure in the at least one container interior R of the drawer 3 by means of the pressure sensor 16. In addition, the controller 8 takes over the regulation of the vacuum pump 1 and the solenoid valve 4. Through an air hose or air channel 11' connected to the vacuum pump 1, the air which has been extracted from the drawer 3 is released into the environment, which is indicated by a dashed arrow in FIG. 2.

Figure 3:
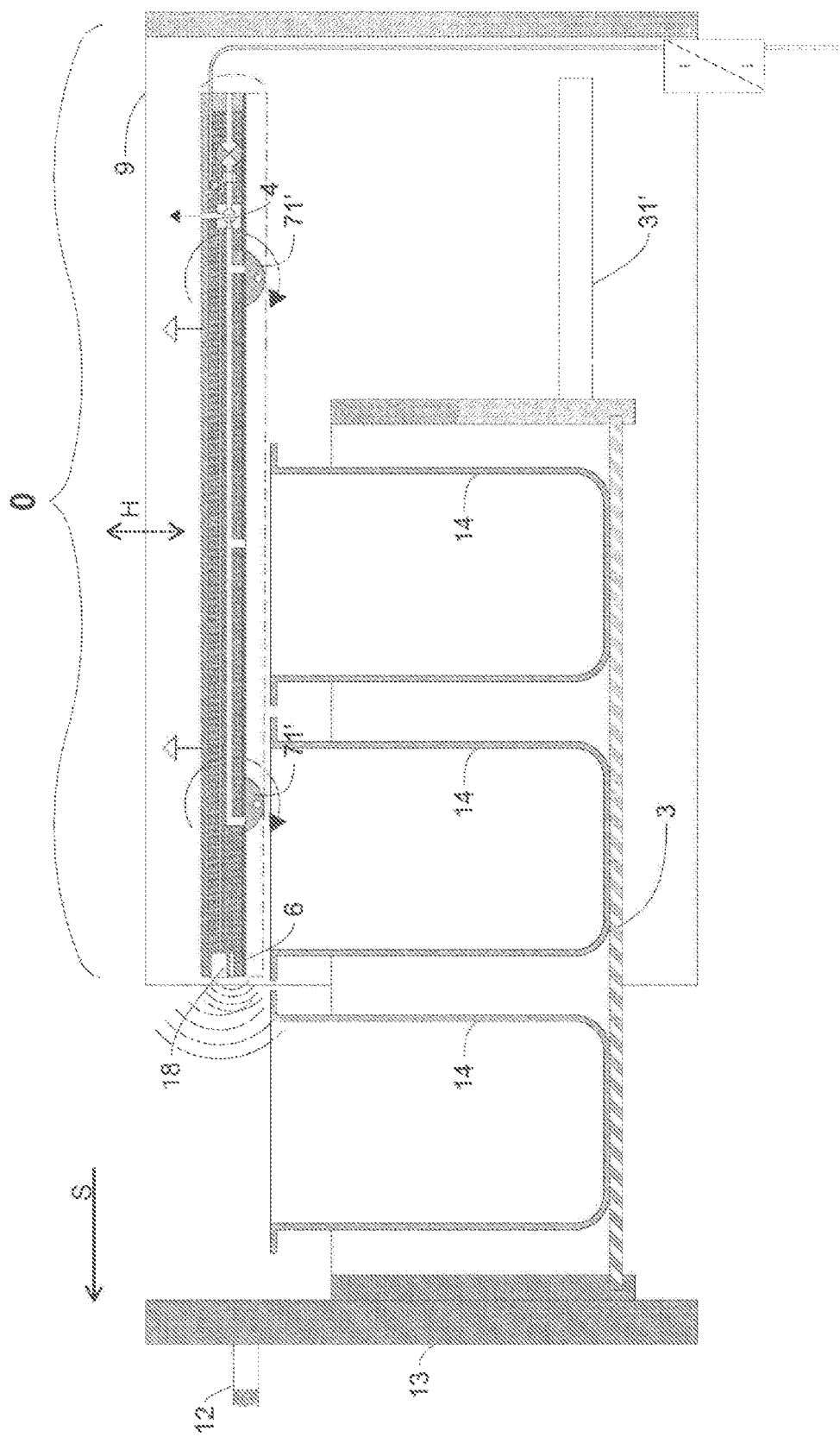
FIG. 3 shows a partially schematic illustration of a longitudinal section through a drawer body with the drawer pulled out halfway.

FIG. 3 illustrates the vacuum drawer device 0 from FIG. 2 in the open position. Like known drawers, the drawer 3 is guided linearly by the user in the direction of drawer movement direction S out of the drawer body 9 by pulling the handle 12 with his/her hand and pulling out of the drawer body 9 the drawer 3 which is movably mounted by means of guide rails 31' and includes the containers 14. In the open position of the drawer 3, the vacuum is broken and the container interior R is under ambient conditions at room temperature and current air pressure or atmospheric pressure at the location of drawer 3.

In order for drawer 3 to be pulled out, the cover 2 or the container interior R must be ventilated beforehand. By means of the proximity sensor 18, the approaching user is detected and a corresponding signal is transmitted to the controller 8 via the control cable 11. Subsequently, the controller 8 opens the valve 4 and ambient air is let into the containers 14 to relieve the vacuum. Air flows through the air channel 11' into the at least one container interior R.

Controlled by the controller 8, the cover 2 is then lifted in the lifting direction H from the edges of the containers 14 by means of the lifting means 7. This vertical movement of cover 2 is performed by the servo discs 71'.

The user can switch the electronic devices in the cover 2 on and off by means of the operating switch 15 located inside the cover 2 on the side facing the front panel 13. This depends on whether the evacuation function is still desired.

Figure 4:
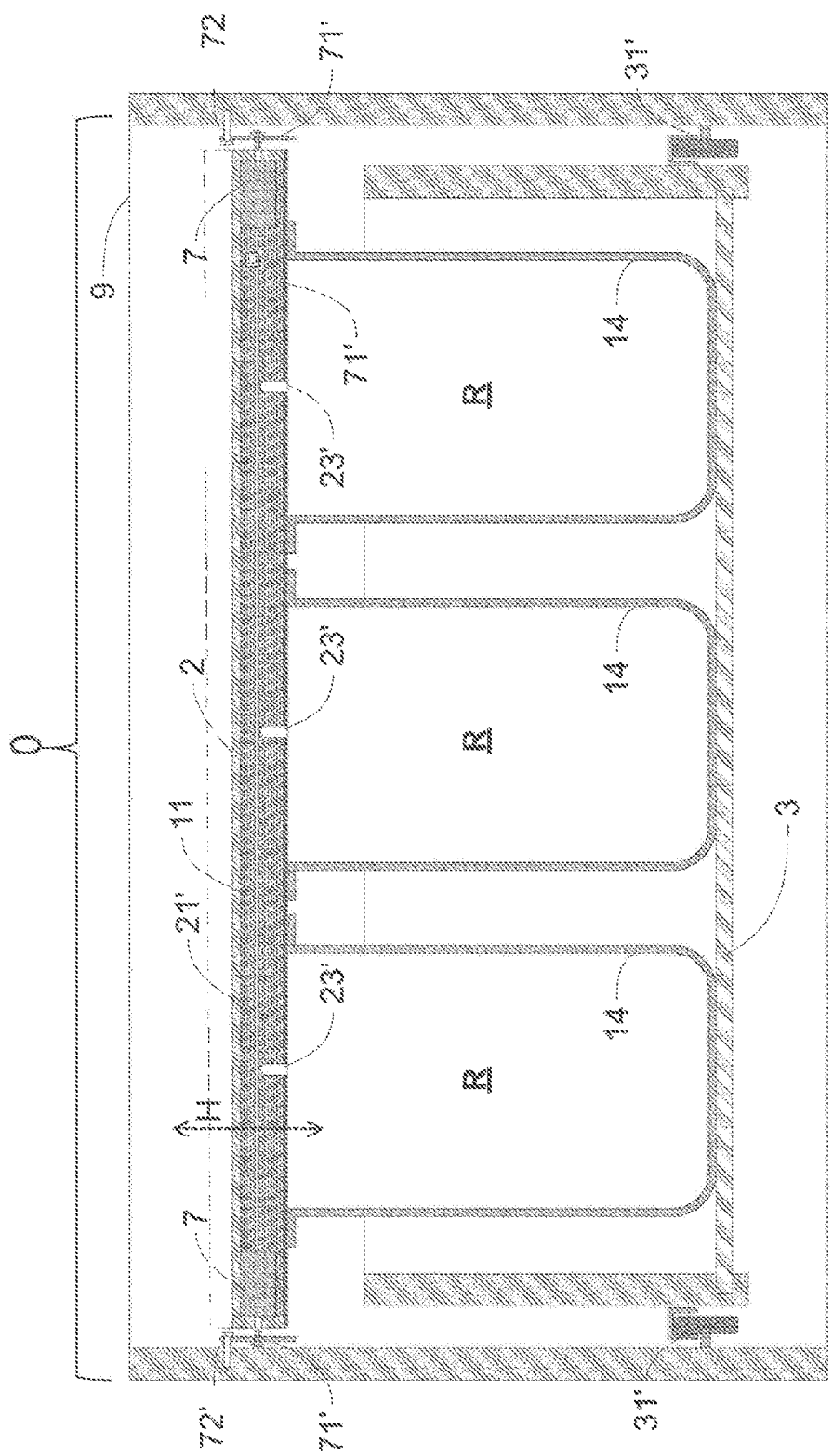
FIG. 4 shows a partially schematic illustration of a cross-section of a drawer body with the drawer closed.

FIG. 4 shows a cross-section of the vacuum drawer device 0 at the level of the servo motors 7 in the closed position of the drawer 3. The cover 2 is located above the containers 14 and is pressed onto the openings of the containers 14 by the servomotors 7 via the servo disk 71', which is connected to the body 9 via screws with bearing sleeves 72', so that the airtight membrane 21' seals the drawer interior R or the container interiors R in an airtight manner. The container interiors R can be evacuated via the air inlet openings 23'. The servo motors 7 are connected to the controller 8 by means of a control cable 11. In order to be able to open the drawer 3, the controller 8 powers the servomotors 7 via the control cables 11 so that the servo discs 71' rotate and lift the cover 2 vertically from the container 14. The drawer 3 can be opened by means of drawer pullouts 31'.

By arranging the foam layer 22' below the airtight membrane 21' or, respectively, between the airtight membrane 21' and the profile of the cover 2, a flat airtight support surface to the edges of the containers 14 is ensured. Accordingly, air can only be pumped out of the at least one drawer interior R, which is hermetically sealed by the airtight membrane 21' and the cover 2, through the at least one air inlet opening 23', through the foam layer 22' and through the air channel 11'.

WAYS OF CARRYING OUT THE INVENTION

The vacuum drawer device 0 presented here, as illustrated in FIGS. 1 to 4, protects the content, such as food, from environmental influences by sealing the contents in the drawer interior R in an airtight manner, thus preventing an exchange of air.

A negative pressure or vacuum is created in the drawer interior R in the range of approx. 0-300 hPa, which is well below the normal ambient atmospheric pressure of approx. 1000 hPa.

To operate the vacuum drawer device 0, electrical energy is required, which is supplied to the power supply unit 5 via the mains cable 10, as illustrated in FIGS. 1-4. The power supply unit 5 converts the alternating voltage into direct voltage and feeds it to the controller 8, the vacuum pump 1 and the solenoid valves 4 by means of the control cable 11.

The controller 8 is directly connected to the proximity sensor 18 and the pressure sensor 16 via the control cables 11.

When the vacuum drawer device 0 is in the closed, operational evacuated state, as illustrated in FIG. 2, the cover 2 rests on the containers 14 and seals them in an airtight manner.

The evacuation is only to be carried out when the drawer 3 is brought into a closed position in the vacuum drawer device 0. The fact that the drawer 3 has been closed is detected by means of the closed position sensor 6 and then forwarded to the controller 8 via control cable 11. The controller 8 puts the pump 1 in operation, which then evacuates the container interiors R via the air inlet openings 23' and the air channel 11', causing the air to flow into the interior of the body 9. The pressure sensor 16 records when the required negative pressure of around 200 hPa is reached and interrupts the electric circuit of pump 1 which stops operation. The products and foodstuffs inside the containers 14 can now be stored in an airtight manner.

If a user now wants to open the vacuum drawer device 0 or the evacuated drawer 3, he/she touches the front panel 13 with his/her hand near the active circuit of the proximity sensor 18. The proximity sensor 18 forwards the recorded touch to the controller 8 via the control cables 11. This in turn puts the pump 1 out of operation and opens the solenoid valve 4 which connects the air channel 11' with the ambient air so that the vacuum is relieved. Thereafter, the controller 8 controls the servo motors 7 which cause the servo discs 71' to rotate so that the cover 2 is lifted from the container 14 in a lifting movement in lifting direction H. As illustrated in FIG. 3, the drawer 3 is opened like a normal drawer by linearly pulling it out in drawer movement direction S.

The drawer 3 and the container 14 thereof can now be safely removed or replaced.

When the user closes drawer 3, the closed position sensor 6 records the closed position of the drawer 3 by detecting the shortening of the distance to the front panel 13 and transmits the signal to the controller 8 via the control cables 11. The controller 8 activates the servo motors 7, which, by rotating the servo disks 71', causes the cover 2 to be lowered onto the containers 14. The airtight membrane 21' seals the containers 14 at the top in an airtight manner. The controller 8 starts the pump 1 which sucks the air out of the containers 14 via the air inlet 23' and the at least one air channel 11' and discharges it to the environment. As soon as the desired negative pressure is reached, the pressure sensor 16 transmits the signal to the controller 8 which stops the pump 1 and closes the solenoid valve 4 to prevent the ambient air from entering the containers 14. The negative pressure now protects the content in the at least one container interior R of the vacuum drawer device 0.

If necessary, the user can switch off the electronics of the vacuum drawer device 0 via the operating switch 15.

Servo motors 7, in particular each comprising a servo disc 71' and a screw 72' with a bearing sleeve, can be selected as lifting means 7 which are integrated in the inside of the cover or, respectively, in the at least one recess A and interact with lifting means 7 in the interior of the drawer body 9. In another embodiment, lifting magnets can also be selected as lifting means 7, which are also integrated in the inside of the cover or, respectively, in the at least one recess A in the cover 2.

The proximity sensor 18 and the closed position sensor 6 are preferably arranged on or in the cover 2, preferably in the inside the cover or in the at least one recess A, and face a front side of the drawer 3.

The proximity sensor 18 is preferably designed as a capacitive sensor. The closed position sensor 6 is preferably designed as induction sensor or microswitch.

Instead of a proximity sensor 18 or closed position sensor 6, at least one acceleration sensor or position sensor can be used. These can be arranged at various positions on the cover 2 or drawer 3. If a user tries to open the evacuated and closed drawer 3, this is detected by the acceleration sensor or position sensor, which is recorded by the controller 8 and activates ventilation of the drawer interior. Depending on the design of the drawer 3, the lifting means 7 or sealing means 24, a lifting movement of the drawer 3 or the release of sealing means 24 is enabled after activation and ventilation. Thereafter, the drawer 3 can be moved linearly relative to the cover 2. If the drawer 3 is moved back into the closed position after an object has been removed, this is detected by the closed position sensor 6, whereupon the evacuation is started.

Various embodiments of the vacuum drawer device 0 presented here are conceivable, wherein differently designed drawers 3 can be equipped with the means necessary for evacuation.

FIG. 5a shows a drawer 3 in a closed position, wherein lifting means 7 are not absolutely necessary in this embodiment of the cover 2. Here, inflatable sealing means 24 are arranged on the cover surface facing the drawer 3. The inflatable sealing means 24 protrude away from the cover surface towards the drawer 3 and are inflated here. Accordingly, the drawer interior R or the interiors of Gastronorm containers 14 placed therein are sealed in an airtight manner. Means for inflating the sealing means 24 or for releasing the air from the sealing means 24 are not shown here. It is substantial, however, that at least one sealing means valve and one pump are required, which can be operated selectively under the control of the controller 8. In an advantageous embodiment, the pump for the sealing means 24 is the pump 1 for the evacuation. With such sealing means 24, the height of which is adjustable, more complex lifting devices 7 can be dispensed with. Otherwise, the ventilation and evacuation of the drawer 3 takes place as described above. Air is pumped out of the drawer interior R through the air channel 11' and fed back through the valve 4 to enable that the drawer 3 can be pulled out of the drawer body 9.

FIG. 5b shows ventilated drawer interiors R, with the air being extracted from the sealing means 24 and a gap being formed between the sealing means 24 and the flanges of the containers 14. In this open position, the cover 2 is no longer in contact with the containers 14 or the drawer 3. As known, the drawer 3 is now pulled out in the drawer movement direction S so that food or containers 14 can be removed or added. Subsequently, the drawer 3 is moved linearly again and thus sunk into the drawer body 9. The controller 8 can then give the signal to inflate the sealing means 24, which press against the edges of the drawer interior R when the air pressure in the sealing means 24 is sufficiently high. As soon as the sealing has taken place, the controller 8 controls the evacuation by means of the pump 1 via the air channel 11'.

Tubular profiles can be selected as sealing means 24, which are glued or welded to the inner surface of the cover. If only one drawer interior R is to be sealed, the sealing means 24 are arranged on the inner surface of the cover in such a manner that the edge of the drawer 3 is covered. If a plurality of Gastronorm containers form the drawer interior R, the sealing means 24 are formed such that the edges of the Gastronorm containers are covered by the sealing means 24. Due to the inflatability of the sealing means 24, height adjustment of the sealing means 24 is achieved. In the inflated state, the sealing means 24 advantageously protrude from the inner surface between 5 and 10 mm further away from the cover than in the deflated state.

The sealing means 24 can be made of different films or membrane materials, which should be elastic and thermoplastic. Preferably, the sealing means 24 should be designed to be suitable for use with food, so that they can be used in kitchens without any problems.

A reduction of the oxygen content by generating the negative pressure or, respectively, the evacuation inhibits the growth of bacteria. As an additional embodiment variant, irradiation of the food in the container 14 or, respectively, in the drawer interior R with ultraviolet light in the wavelength range of 254-280 nm is advantageous. This ultraviolet light is achieved by a stationary arrangement of at least one UVC LED, preferably on the cover 2 with the corresponding cabling to the controller 8. The controller 8 provides for permanent or time-controlled irradiation with UVC light by corresponding actuation of at least one UVC LED while the drawer interior R is evacuated. The radiation actively destroys the DNA of the bacteria and can therefore not only inhibit growth but also kill the bacteria. Particularly preferred, at least one UVC LED per drawer interior R is/are distributed on the cover 2 at the level of each drawer interior R.

By closing the drawer interior R or, respectively, the containers 14, the relative humidity increases because the food releases moisture. The drawer interior R or, respectively, the containers 14 can be provided with hygroscopic material so that moisture is removed from the ambient air.

In order to permanently prevent an excessive increase in relative humidity, the controller 8 can be programmed in such a manner that air exchange takes place at regular intervals. If additional humidity sensors are used in the containers 14 or in the drawer interior R, which are also connected to the controller 8, the actual relative humidity can be measured and, depending on the measured value, an air exchange can be carried out in a controlled manner. Corresponding humidity sensors and the connection to the controller 8 are known to the person skilled in the art. The placement of the humidity sensors is important so that correct values can be determined.

REFERENCE LIST

0 vacuum drawer device
1 pump/air pump
11' air channel/ventilation duct
2 cover
21' airtight membrane
22' foam layer
23' air inlet opening
24 sealing means
3 drawer
31' drawer pullout
4 valve/solenoid valve
5 power supply unit
6 closed position sensor
7 lifting means/servo motor
71' servo disc
72' screw with bearing sleeve
8 controller
9 drawer body
10 power cable
11 control cable
12 handle
13 front panel
14 container
15 operating switch/on-off switch
16 pressure sensor
17 frame
18 proximity sensor
R drawer interior/an interior or the interior of Gastronorm containers 14 placed in the drawer interior
S drawer movement direction
H lifting direction
A recess

The invention claimed is:

1. A cover for installation in a drawer body, the cover including an evacuation system and arrangeable so as to be operatively connectable to a linearly movable drawer for evacuating at least one drawer interior by the evacuation system, so that the at least one drawer interior is evacuated when the drawer is in a closed position and is ventilated before the drawer is opened,
wherein the cover is designed to be airtight when operatively connected to the drawer,
wherein the evacuation system is in the form of a controller, a pump and a valve secured in the cover,
wherein the cover has at least one air channel leading into the inside of the cover, with the air channel operatively connected to the evacuation system such that, when the cover is placed on the drawer, air from the at least one drawer interior is pumpable out of the at least one drawer interior and the inside of the cover through the air channel,
wherein lifting means arranged operatively connected to the drawer body and at least partially in the inside of the cover are connected to the controller so that the cover is secured such that the cover can be lifted and lowered in an aligned manner relative to the drawer body in a lifting direction perpendicular to the drawer movement direction of the drawer, and
wherein the lifting means are servo motors or lifting magnets integrated inside the cover or, respectively, in at least one recess in the cover.

2. The cover according to claim 1, wherein a side of the cover facing the at least one drawer interior is covered with an airtight membrane, which is provided with at least one air inlet opening completely crossing the membrane, such that a connection between the air inlet opening and the air channel is created.

3. The cover according to claim 2, wherein a foam layer is inserted in the inside of the cover or, respectively, the at least one recess of the cover, the foam layer connected to the airtight membrane on the side facing the at least one drawer interior such that air can only be pumped out of the at least one drawer interior, which is closed in an airtight manner by the cover, through the at least one air inlet opening, through the foam layer and through the air channel.

4. The cover according to claim 1, wherein the lifting means are servo motors and wherein each servo motor comprises a servo disc and a screw with a bearing sleeve.

5. The cover according to claim 1, wherein a proximity sensor facing a front side of the drawer is arranged on or in the cover and is connected to the controller, so that a contact of the drawer can be detected by the proximity sensor and the vacuum in the at least one drawer interior can be generated or, respectively, relieved in a selectively controllable manner.

6. The cover according to claim 5, wherein the proximity sensor is designed as capacitive sensor, an acceleration sensor, or a position sensor.

7. The cover according to claim 5, wherein the proximity sensor is arranged inside the cover or in at least one recess on the cover.

8. The cover according to claim 1, wherein a closed position sensor facing a front side of the drawer is arranged on or in the cover and connected to the controller so that the controller starts the evacuation system when the drawer reaches the closed position.

9. The cover according to claim 8, wherein the closed position sensor is designed as an induction sensor or microswitch.

10. The cover according to claim 1, wherein the cover is formed from a dimensionally stable MDF board with an airtight coating.

11. The cover according to claim 10, wherein the airtight coating is in the form of a lacquer.

12. The cover according to claim 1, wherein at least one UVC LED is arranged on the cover and is connected to the controller.

13. A vacuum drawer device, comprising a drawer which can be moved linearly in a drawer movement direction and has at least one drawer interior which can be closed by the cover according to claim 1.

14. The vacuum drawer device according to claim 13, wherein the drawer accommodates a plurality of Gastronorm containers, the interiors of which form the drawer interior, and the cover can be lifted and lowered and operatively connected on the edges of the Gastronorm containers so as to seal the interiors of the Gastronorm containers in an airtight manner.

15. The vacuum drawer device according to claim 13, wherein the drawer is mounted in a drawer body so as to be linearly extendable and retractable by a drawer pullout/guide profile.

16. The vacuum drawer device according to claim 13, wherein at least one humidity sensor is arranged in a container and/or in the drawer interior and is operatively connected to the controller.

17. The cover according to claim 1, wherein the lifting means are lifting magnets.

* * * * *